United States Patent
Benhase et al.

(10) Patent No.: US 7,421,519 B2
(45) Date of Patent: Sep. 2, 2008

(54) METHOD FOR THE DETECTION OF MISDIRECTED DATA

(75) Inventors: Michael Thomas Benhase, Tucson, AZ (US); James Chien-Chiung Chen, Tucson, AZ (US); Patricia Ching Lu, Fremont, CA (US); Frederick James Carberry, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/719,440

(22) Filed: Nov. 20, 2003

(65) Prior Publication Data

US 2005/0138489 A1 Jun. 23, 2005

(51) Int. Cl.
*G06F 12/00* (2006.01)
*G06F 3/00* (2006.01)

(52) U.S. Cl. ............... 710/36; 710/3; 710/5; 710/8; 711/100

(58) Field of Classification Search ............ 710/36
See application file for complete search history.

(56) References Cited

U.S. PATENT DOCUMENTS

| | | | |
|---|---|---|---|
| 5,544,347 A | 8/1996 | Yanai et al. | |
| 6,131,148 A | 10/2000 | West et al. | |
| 6,453,392 B1 * | 9/2002 | Flynn, Jr. ............... | 710/36 |
| 6,820,168 B2 * | 11/2004 | Tanaka et al. ........... | 711/6 |
| 7,051,121 B2 * | 5/2006 | Ohno et al. ............. | 710/36 |
| 2002/0161852 A1 | 10/2002 | Allen et al. | |
| 2002/0199060 A1 | 12/2002 | Peters et al. | |

FOREIGN PATENT DOCUMENTS

| | | |
|---|---|---|
| EP | 1 357 476 A2 | 10/2003 |
| JP | 2002271440 A | 9/2002 |

OTHER PUBLICATIONS

PCT International Search Report, PCT/EP2004/052979 filed Nov. 16, 2004.
PCT Written Opinion, PCT/EP2004/052979 filed Nov. 16, 2004.
"Fibre Channel Framing and Signaling", INCITS working draft proposed American National Standard of Accredited Standards Committee, Apr. 9, 2003, Chpater 4.
G. Castets et al., "IBM TotalStorage Enterprise Storage Server Implementing ESS Copy Services with IBM e server zSeries", IBM Corporation, Document No. SG24-5680-01, Apr. 2003, Chap. 1.

* cited by examiner

*Primary Examiner*—Alan Chen
(74) *Attorney, Agent, or Firm*—Rabindranath Dutta; Konrad Raynes & Victor, LLP

(57) ABSTRACT

Provided is a method, wherein in certain embodiments an I/O command from a host is received at a first storage unit. An identifier is generated that identifies a destination to which the I/O command is to be transmitted from the first storage unit. The I/O command is augmented with the generated identifier at the first storage unit. The augmented I/O command is transmitted. In certain other embodiments, an I/O command is received at a storage unit, wherein the storage unit is associated with a storage unit identifier. A determination is made at the storage unit, whether the I/O command is associated with an identifier that identifies a destination for which the I/O command is intended. A further determination is made, at the storage unit, whether the identifier is the same as the storage unit identifier, in response to determining that the identifier associated with the I/O command identifies the destination for which the I/O command is intended.

9 Claims, 5 Drawing Sheets

METHOD FOR THE DETECTION OF MISDIRECTED DATA

BACKGROUND

1. Field

The present invention relates to a method, system, and an article of manufacture for the detection of misdirected data.

2. Description of the Related Art

Fibre channel networks may be used in storage area networking (SAN) environments to attach servers and storage. In certain implementations, Fibre channel networks may also be used to allow for peer-to-peer connections between storage devices. Fiber channel networks may be classified into a variety of topologies. In a point-to-point topology, each pair of network components are connected via dedicated links. In an arbitrated loop topology, groups of network components are connected via a loop. In a switched fabric topology, network components are connected via switches.

If errors occur in a switched fabric network, determining the source of the error may include analyzing the potentially large number of components in the switched fabric network. In certain situations, cables may be unplugged temporarily from the switched fabric network and the corresponding effects on the network may be noted in order to perform error diagnosis. In such a situation, and in various other situations, cables may be accidentally swapped resulting in misdirected data in the network. Misdirected data in the network may also be caused by failure of microcode logic or because of a variety of other reasons. If the misdirected data is not detected, data corruption may occur in storage devices coupled to the network. Misdirected data and data corruption may also occur in other types for networks.

Certain networked information technology systems, including storage systems, may need protection from site disasters or outages. Implementations for protecting from site disasters or outages may include mirroring or copying of data in storage systems. Such mirroring or copying of data may involve interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers may be connected to a network, such as a fibre channel network, and include features for copying data in storage systems. Peer-to-Peer Remote Copy (PPRC) is an ESS copy function that allows the shadowing of application system data from a first site to a second site. The first site may be referred to as an application site, a local site, or a primary site. The second site may be referred to as a recovery site, a remote site, or a secondary site. In certain implementations, the first and second site may be coupled via fibre channel networks that includes switches.

SUMMARY OF THE PREFERRED EMBODIMENTS

Provided are a method, system and article of manufacture, wherein in certain embodiments an I/O command from a host is received at a first storage unit. An identifier is generated that identifies a destination to which the I/O command is to be transmitted from the first storage unit. The I/O command is augmented with the generated identifier at the first storage unit. The augmented I/O command is transmitted.

In further embodiments, the transmitted augmented I/O command is received at a second storage unit, wherein the second storage unit is associated with a second storage unit identifier. A determination is made, at the second storage unit, if the generated identifier that augmented the I/O command is the same as the second storage unit identifier. The I/O command is executed, at the second storage unit, in response to determining that the generated identifier that augmented the I/O command is the same as the second storage unit identifier.

In yet additional embodiments, the transmitted augmented I/O command is received at a second storage unit, wherein the second storage unit is associated with a second storage unit identifier. A determination is made at the second storage unit, if the generated identifier that augmented the I/O command is the same as the second storage unit identifier. A failure is generated, at the second storage unit, in response to determining that the generated identifier that augmented the I/O command is not the same as the second storage unit identifier.

In still further embodiments, the second storage unit is a second storage control unit, and wherein generating the identifier further comprises: (a) associating with the identifier, a World Wide Node Name of the second storage control unit; (b) associating with the identifier, a World Wide Port Name of a port of a fibre channel adapter coupled to the second storage control unit, wherein the port is used for communications; and (c) associating with the identifier, a storage subsystem identification of a storage subsystem coupled to the second storage control unit.

In yet additional embodiments, the first storage unit is coupled to a first fibre channel adapter, wherein the destination is coupled to a second fibre channel adapter, wherein the first fibre channel adapter is coupled to the second fibre channel adapter via a switched fabric, and wherein the switched fabric includes a plurality of switches.

In still further embodiments, the first storage unit is a primary storage control unit and the destination is a secondary storage control unit, and wherein the primary storage control unit is coupled to the secondary storage control unit.

Provided are another method, system, and article of manufacture, wherein in certain embodiments, an I/O command is received at a storage unit, wherein the storage unit is associated with a storage unit identifier. A determination is made at the storage unit, whether the I/O command is associated with an identifier that identifies a destination for which the I/O command is intended. A further determination is made, at the storage unit, whether the identifier is the same as the storage unit identifier, in response to determining that the identifier associated with the I/O command identifies the destination for which the I/O command is intended.

In additional embodiments, the I/O command is executed, at the storage unit, in response to determining that the identifier is the same as the storage unit identifier.

In yet further embodiments, a failure is generated, at the storage unit, in response to determining that the identifier is not the same as the as the storage unit identifier.

In further embodiments, the storage unit is a secondary storage control unit, and wherein the identifier further comprises: (a) a World Wide Node Name of the secondary storage control unit; (b) a World Wide Port Name of a port of a fibre channel adapter coupled to the secondary storage control unit, wherein the port is used for communications; and (c) a storage subsystem identification of a storage subsystem coupled to the secondary storage control unit.

In certain embodiments implemented in a fibre channel PPRC environment, peer storage control units may participate in a PPRC relationship. In response to a write from a host to a primary storage control unit, the primary storage control unit may mirror the write to a secondary storage control unit. Additional control data may be sent from the primary storage control unit to the secondary storage control unit in order to detect misdirected data.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Figure 1:
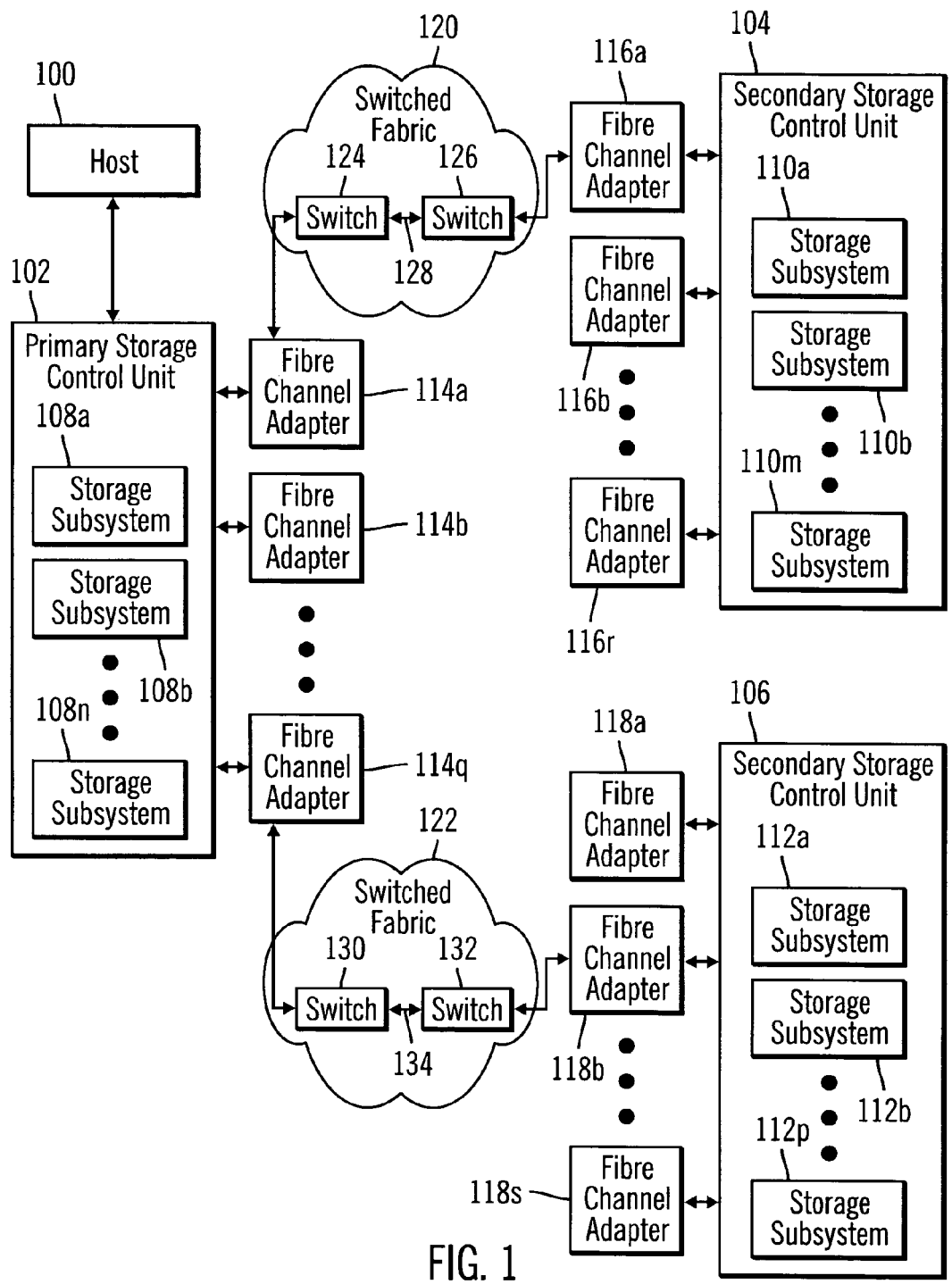
FIG. 1 illustrates a block diagram of a computing environment, in accordance with certain described aspects of the invention.

FIG. 1 illustrates a block diagram of a computing environment, in accordance with certain described aspects of the invention. A host 100 is coupled to a storage unit, such as, a primary storage control unit 102, where the host 100 may sent input/output (I/O) requests to the primary storage control unit 102. The primary storage control unit 102 may send the I/O requests to one or more other storage units, such as, secondary storage control units 104, 106. Although only two secondary storage control units 104, 106 are shown, certain embodiments may include a greater or a fewer number of secondary storage control units. Furthermore, while only a single host 100 is shown coupled to the primary storage control unit 102, in other embodiments a plurality of hosts may be coupled to the primary storage control unit 102. The host 100 may be any computational device known in the art, such as a personal computer, a workstation, a server, a mainframe, a hand held computer, a palm top computer, a telephony device, network appliance, etc.

In certain embodiments, the primary storage control unit 102 and the secondary storage control units 104, 106 are coupled by a fibre channel data interface mechanism. In other embodiments, different data interface mechanisms may be used to couple the primary storage control unit 102 to the secondary storage control units 104, 106.

The storage control units 102, 104, 106 may each include one or more storage subsystems. For example, the primary storage control unit 102 may include storage subsystems 108a . . . 108n, the secondary storage control unit 104 may include storage subsystems 110a . . . 110m, and the secondary storage control unit 106 may include storage subsystems 112a . . . 112p. In certain embodiments, the storage subsystems may be computational devices that include storage volumes (not shown) configured as a Direct Access Storage Device (DASD), one or more RAID ranks, Just a bunch of disks (JBOD), or any other data repository system known in the art. In certain embodiments, the storage subsystems 108a . . . 108n, 110a . . . 110m, 112a . . . 112p may be managed by an user or a customer.

In certain embodiments, the storage control units 102, 104, 106 are coupled to one or more fibre channel adapters. For example, the primary storage control unit 102 may be coupled to fibre channel adapters 114a . . . 114q, the secondary storage control unit 104 may be coupled to fibre channel adapters 116a . . . 116r, and the secondary storage control unit 106 may be coupled to fibre channel adapters 118a . . . 118s.

In some embodiments, a switched fabric may couple a first fibre channel adapter coupled to the primary storage control unit 102, to a second fibre channel adapter coupled to a secondary storage control unit 104, 106. For example, a switched fabric 120 couples the fibre channel adapter 114a that is coupled to the primary storage control unit 102, to the fibre channel adapter 116a that is coupled to the secondary storage control unit 104. Additionally, a switched fabric 122 couples the fibre channel adapter 114q that is coupled to the primary storage control unit 102, to the fibre channel adapter 118b that is coupled to the secondary storage control unit 106. Therefore, in certain embodiments the primary storage control unit 102 may communicate with the secondary storage control units 104, 106 via fibre channel adapters 114a . . . 114q, 116a . . . 116r, 118a . . . 118s and the switched fabrics 120, 122.

In certain embodiments, the switched fabrics 120, 122 may include one or more switches. For example, switched fabric 120 includes switches 124 and 126, where the switches 124 and 126 are interconnected via a cable 126. Switched fabric 122 may include switches 130 and 132, where the switches 130 and 132 are interconnected via a cable 134.

In certain situations, the primary storage control unit 102 sends an I/O command to the secondary storage control unit 104 via the fibre channel adapter 114a, the switch 124, the cable 128, the switch 126, and the fibre channel adapter 116a. In certain situations, the cable 128 may be accidentally disconnected from switch 128 and may be connected to switch 132. In such a situations I/O commands sent by the primary storage control unit 102, where the I/O commands are intended for the secondary storage control 104, may be misdirected to the secondary storage control 106. If the secondary storage control 106 executes the misdirected I/O commands then data in the secondary storage control 106 may not be consistent with data in the primary storage control unit 102.

Therefore, FIG. 1, illustrates a computing environment where a primary storage control unit 102 sends I/O requests to a secondary storage control unit, such as, the secondary storage control unit 104. The I/O requests may be sent over fibre channel adapters coupled to a switched fabric that includes a plurality of switches.

Figure 2:
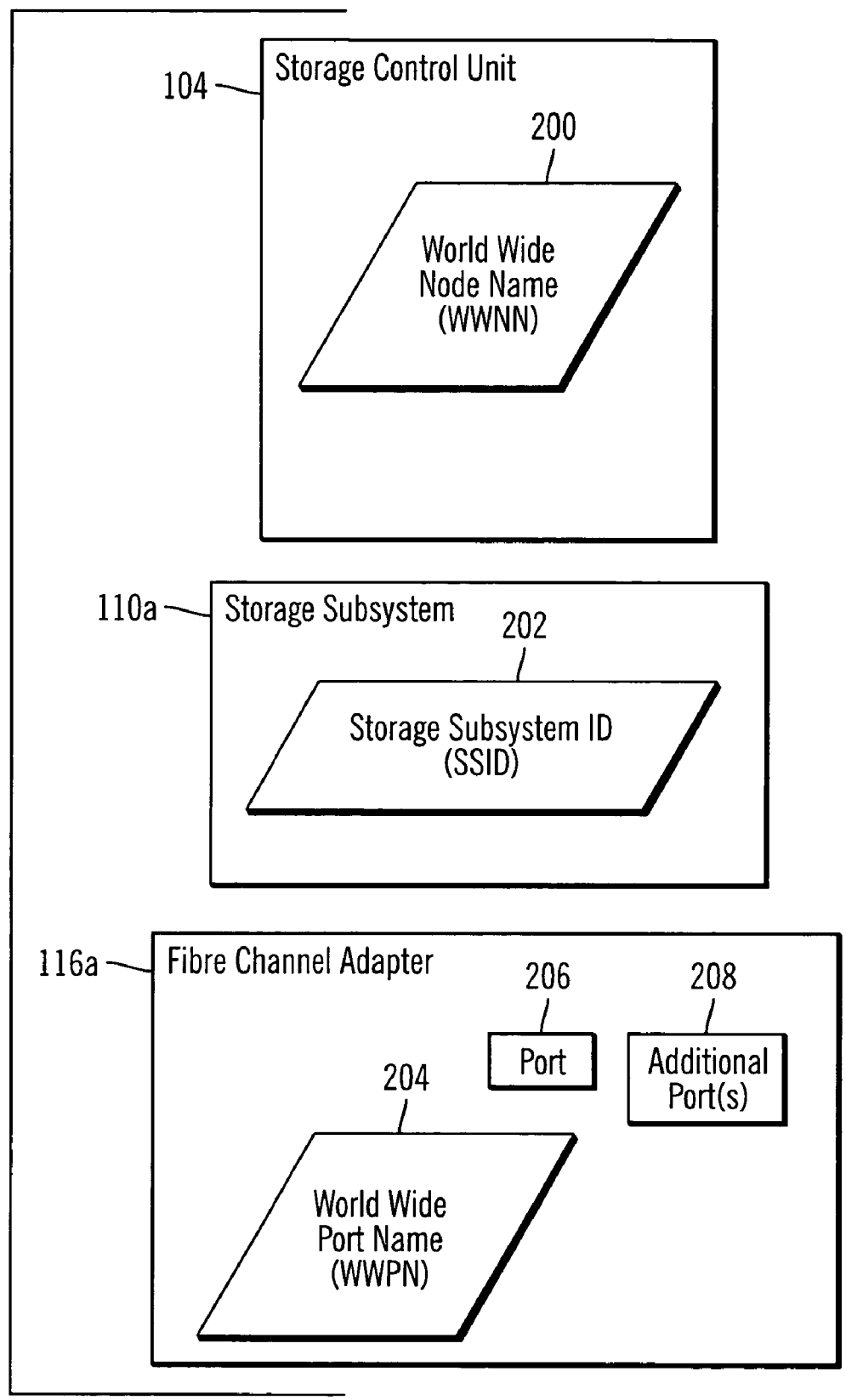
FIG. 2 illustrates a block diagram of data structures implemented in the computing environment, in accordance with certain described implementations of the invention.

FIG. 2 illustrates a block diagram of data structures implemented in the storage control units 104, 106, the storage subsystems 110a . . . 110m, 112a . . . 112p, and the fibre channel adapters 116a . . . 116r, 118a . . . 118s, in accordance with certain described implementations of the invention.

The storage control units 104, 106, such as, storage control unit 104, may include a data structure that corresponds to a World Wide Node Name (WWNN) 200, where the WWNN 200 is an identification of the storage control unit 104.

The storage subsystems 110a . . . 110m, 112a . . . 112p, such as storage subsystem 110a, may include a data structure that corresponds to a Storage Subsystem ID (SSID) 202, where the SSID 202 is an identification of the storage subsystem 110a.

The fibre channel adapters 116a ... 116r, 118a ... 118s, such as fibre channel adapter 116a, may include a data structure that corresponds to a World Wide Port Name (WWPN) 204, where the WWPN 204 may be an identification of a port 206 of the fibre channel adapter 116a. In certain embodiments, the fibre channel adapter 116a may establish communications between the primary storage control unit 102 and the secondary storage control unit 104 via the port 206. In certain additional embodiments there may be additional ports 208 in the fibre channel adapter 116a. In general, any fibre channel adapter may include one or more ports, where each port may be used for a different fibre channel link.

In certain embodiments, when the primary storage control unit 102 executes instructions to send I/O commands to the secondary storage control unit 104, the primary storage control unit 102 may request the switch 124 (via the fibre channel adapter 114a) to return a destination ID (not shown) of the secondary storage control unit 104 by supplying the WWPN 204 to the switch 124. In certain embodiments, the switch 124 may, in conjunction with nameservers implemented in the switched fabric 120, return the destination ID of the secondary storage control unit 104. The primary storage control unit 102 may log on to the secondary storage control unit 104 by using the destination ID. After logging on, the primary storage control unit 102 may send I/O commands to the secondary storage control unit 104.

The destination ID of a secondary storage control unit may not always be unique. For example, in certain embodiments the secondary storage control unit 104 may be referred to with the destination address of one in the switched fabric 120, and the secondary storage control unit 106 may also be referred to with the destination address of one in the switched fabric 122. In such a situation, if the cable 128 is disconnected from switch 126 and connected to switch 132, after the primary storage control unit 102 has started sending I/O commands to the secondary storage control unit 104 by using the destination ID of one, then the primary storage control unit 102 would be misdirecting the I/O commands to the secondary storage control unit 106 via the switched fabric 122 because the destination ID of one appears to the switched fabric 122 as the secondary storage control unit 106. If the secondary storage control unit 106 executes the received I/O commands, then data in the secondary storage control unit 106 may not be consistent with the primary storage control unit 104. It would be desirable if the secondary storage control unit 106 could determine from the received I/O commands whether the I/O commands were misdirected to the secondary storage control unit 106.

Therefore, FIG. 2 illustrates a block diagram of data structures, such as, WWNN 200, SSID 202, and WWPN 204, and the role of the data structures in identifying storage control units, storage subsystems, and fibre channel adapters.

Figure 3:
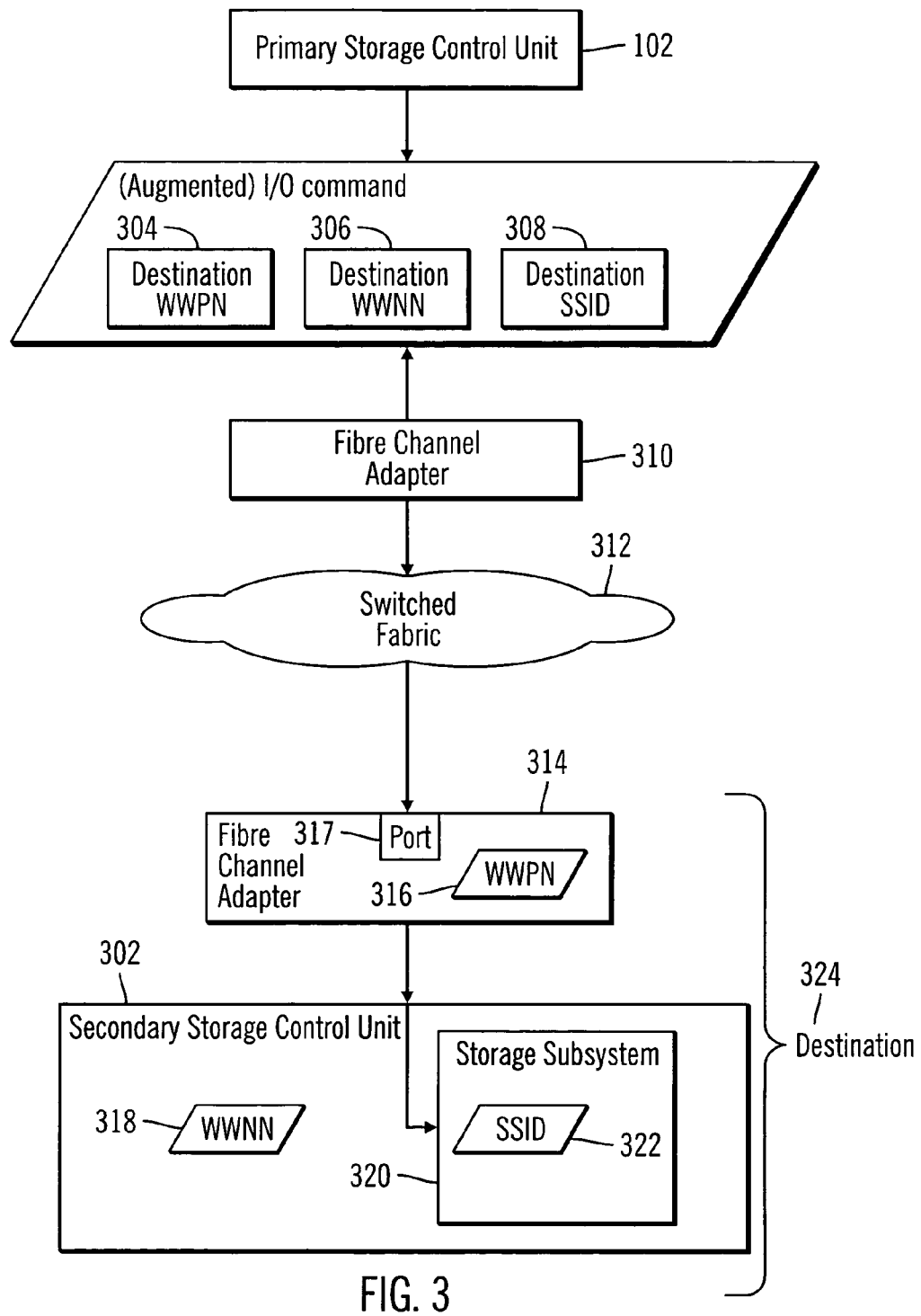
FIG. 3 illustrates a block diagram of an I/O command being transferred from a primary storage control unit to a secondary storage control unit, in accordance with certain described implementations of the invention.

FIG. 3 illustrates a block diagram of an I/O command 300 being transferred from the primary storage control unit 102 to a secondary storage control unit 302, in accordance with certain embodiments.

The I/O command 300 may have been received at the primary storage control unit 102 from the host 100. The primary storage control unit 102 may include in the I/O command 300, a destination WWPN 304, a destination WWNN 306, and a destination SSID 308. In alternative embodiments, frames may be augmented similarly, instead of the I/O commands.

The destination WWPN 304 identifies the port of the fibre channel adapter for which the I/O command 300 is intended. The destination WNNN 306 identifies the secondary storage control unit for which the I/O command 300 is intended. The destination SSID 308 identifies the storage subsystem for which the I/O command 300 is intended.

The I/O command 300 sequentially passes through a fibre channel adapter 310 that is coupled to the primary storage control unit 300, a switched fabric 312, and then reaches a fibre channel adapter 314 that is coupled to the secondary storage control unit 302. The fibre channel adapter 314 may have a WWPN 316 associated with a port 317, and the secondary storage control unit 302 may have a WWNN 318. The secondary storage control unit 302 may also include a storage subsystem 320 with a SSID 322.

In certain embodiments, the fibre channel adapter 314, the secondary storage control unit 302, and the storage subsystem 320 may compare the destination WWPN 304, the destination WWNN 306, and the destination SSID 308 to the WWPN 316, WWNN 318 and SSID 322 respectively. If the destination ids 304, 306, 308 do not match the corresponding ids 316, 318, 322 then a failure may be generated indicating that the I/O command 300 should not be executed at the secondary storage control unit 302. If the destination ids 304, 306, 308 match the corresponding ids 316, 318, 322 then the I/O command 300 is intended for the secondary storage control unit 302 and is executed at the storage subsystem 320.

In certain embodiments, an user or a customer may misidentify a storage subsystem 110a ... 110m, 112a ... 112p. For example, an user or a customer may renumber a storage subsystem after the storage subsystem has been included in the secondary storage control unit 104. In such a situation, if the I/O command 300 reached the renumbered storage subsystem, the destination SSID 308 would not match the SSID of the renumbered storage subsystem and a failure may be generated. Therefore, an user or a customer would be protected against unintentional misnumbering of a storage subsystem.

Therefore, FIG. 3 illustrates an embodiment for detecting misdirected I/O commands by comparing destination ids 304, 306, 308 included in a transmitted I/O command 300 with ids 316, 318, 322 stored at a destination 324. In certain embodiments, a fibre channel adapter 314 coupled to a secondary storage control unit 302 that includes a storage subsystem 320 may comprise the destination 324.

Figure 4:
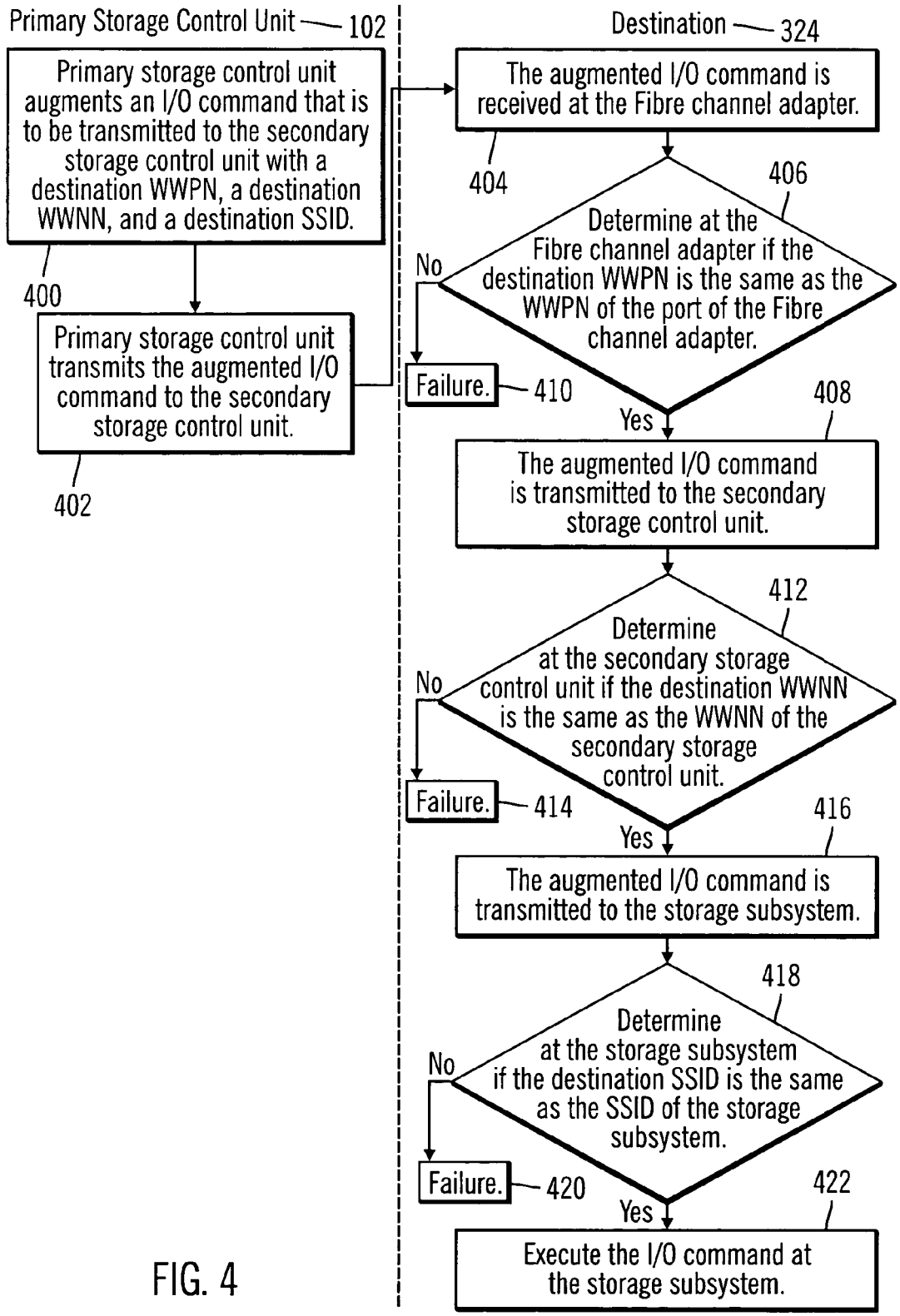
FIG. 4 illustrates logic for detecting misdirected data, in accordance with certain described implementations of the invention.

FIG. 4 illustrates logic for detecting misdirected data transmitted by the primary storage control unit 102 and received at the destination 324, in accordance with certain described implementations of the invention.

Control starts at block 400, where the primary storage control unit 102 augments an I/O command 300 that is intended to be transmitted to the destination 324, with a destination WWPN 304, a destination WWNN 306, and a destination SSID 308, where the destination ids 304, 306, 308 identify the port of the fibre channel adapter, the storage control unit, and the storage subsystem respectively, at the destination 324. In certain embodiments, the primary storage control unit 102 transmits (at block 402) the augmented I/O command 300, where the transmission is intended for the secondary storage control unit comprising the destination 324 whose associated ids augment the I/O command 300. However, because of various reasons including accidental swapping of cables, microcode logic error, renumbering of storage subsystems, etc., in certain embodiments the I/O command 300 may or may not reach the correct destination for which the I/O command 300 is intended.

In certain embodiments, the transmitted augmented I/O command 300 is received (at block 404) at the fibre channel adapter 314 after the I/O command 300 has passed through the fibre channel adapter 310 coupled to the primary storage control 102 and the switched fabric 312.

The fibre channel adapter 314 determines (at block 406), via logic implemented either internally or externally to the fibre channel adapter 314, whether the destination WWPN 304 is the same as the WWPN 316 associated with the port 317 of the fibre channel adapter 314. If so, the fibre channel adapter 314 transmits (at block 408) the augmented I/O command 300 to the secondary storage control unit 302. If not, the fibre channel adapter 314 generates (at block 410) a failure.

The secondary storage control unit 302 determines (at block 412) whether the destination WWNN 306 is the same as the WWNN 318 of the secondary storage control unit 302. If so, the secondary storage control 302 transmits (at block 416) the augmented I/O command 300 to the storage subsystem 320. If not, the secondary storage control unit 302 generates (at block 414) a failure.

The storage subsystem 320 determines (at block 418) whether the destination SSID 308 is the same as the SSID 322 of the storage subsystem. If so, the storage subsystem 320 executes (at block 422) the I/O command 300 at the storage subsystem 320. If not, the storage subsystem 320 generates (at block 420) a failure.

Therefore, FIG. 4 illustrates an embodiment for detecting misdirected I/O commands by comparing destination ids 304, 306, 308 included in a transmitted I/O command 300 with ids 316, 318, 322 that are stored at a destination 324. In alternative embodiments, a lesser or greater number of destination ids may be used. Furthermore, in additional embodiments, the comparisons of the destination ids 304, 306, 308 to the ids stored at the destination 324 may be performed differently.

In certain embodiments implemented in a fibre channel PPRC environment, peer storage control units, such as, the primary storage control unit 102 and the secondary storage control unit 104, may participate in a peer to peer copy relationship. In response to a write from the host 100 to the primary storage control unit 102, the primary storage control unit 102 may mirror the write to the secondary storage control unit 104. Additional control data may be sent from the primary storage control unit 102 to the secondary storage control unit 104 in order to detect misdirected data.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 5:
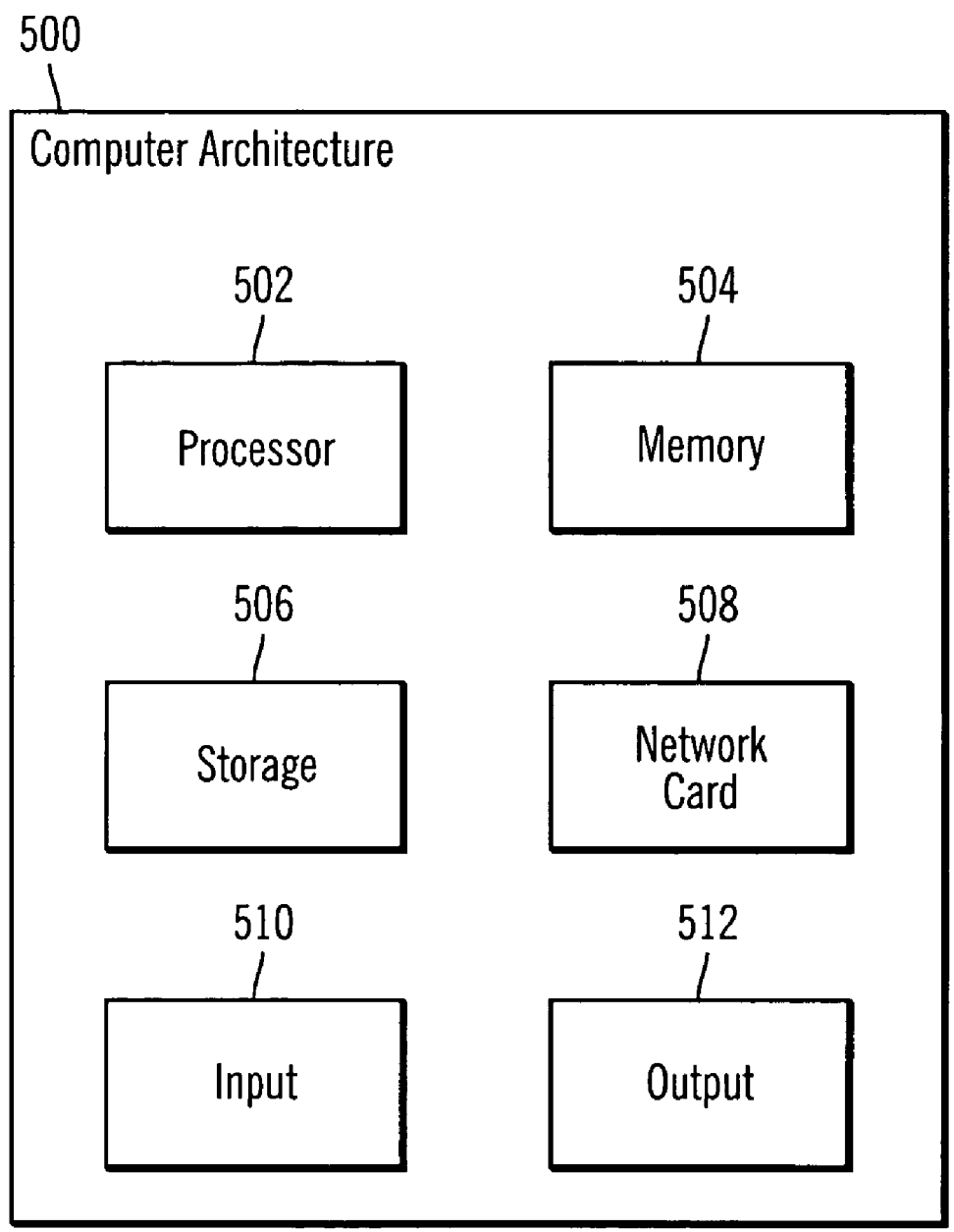
FIG. 5 illustrates a block diagram of a computer architecture in which certain described aspects of the invention are implemented.

FIG. 5 illustrates a block diagram of a computer architecture in which certain aspects of the invention are implemented. FIG. 5 illustrates one implementation of the host 100, and the storage control units 102, 104, 106, and the storage subsystems 108a ... 108n, 110a ... 110m, 112a ... 122p. The host 100, the storage control units 102, 104, 106, and the storage subsystems 108a ... 108n, 110a ... 110m, 112a ... 122p may implement a computer architecture 500 having a processor 502, a memory 504 (e.g., a volatile memory device), and storage 506 (e.g., a non-volatile storage, magnetic disk drives, optical disk drives, tape drives, etc.). The storage 506 may comprise an internal storage device, an attached storage device or a network accessible storage device. Programs in the storage 506 may be loaded into the memory 504 and executed by the processor 502 in a manner known in the art. The architecture may further include a network card 508 to enable communication with a network. The architecture may also include at least one input 510, such as a keyboard, a touchscreen, a pen, voice-activated input, etc., and at least one output 512, such as a display device, a speaker, a printer, etc.

The logic of FIG. 4 describes specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

The embodiments have been described with respect to I/O commands. In alternative embodiments, the embodiments may be implemented with frames or other data transmission units. Alternative embodiments may use extended command descriptor blocks augmented with the WWNN, SSID, etc., of the intended target. Furthermore, the embodiments may also be implemented in networks that are not based on fibre channel. Additionally, more than one port of a fibre channel adapter may be used for communications, and alternative embodiments may utilize more than one port.

Many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:
  receiving, at a first storage unit, an I/O command from a host;
  generating an identifier that identifies a destination that is a second storage unit to which the I/O command is to be transmitted from the first storage unit;
  augmenting the I/O command with the generated identifier at the first storage unit; and
  transmitting the augmented I/O command, wherein the first storage unit is a first storage control unit, wherein the second storage unit is a second storage control unit, and wherein generating the identifier further comprises:
   (i) associating with the identifier, a World Wide Node Name of the second storage control unit;
   (ii) associating with the identifier, a World Wide Port Name of a port of a fibre channel adapter coupled to the second storage control unit, wherein the port is used for communications; and
   (iii) associating with the identifier, a storage subsystem identification of a storage subsystem coupled to the second storage control unit.

2. The method of claim 1, further comprising:
  receiving the transmitted augmented I/O command at the second storage unit, wherein the second storage unit is associated with a second storage unit identifier;
  determining, at the second storage unit, if the generated identifier that augmented the I/O command is the same as the second storage unit identifier; and
  executing the I/O command, at the second storage unit, in response to determining that the generated identifier that augmented the I/O command is the same as the second storage unit identifier.

3. The method of claim 1, further comprising:
  receiving the transmitted augmented I/O command at the second storage unit, wherein the second storage unit is associated with a second storage unit identifier;
  determining, at the second storage unit, if the generated identifier that augmented the I/O command is the same as the second storage unit identifier; and
  generating a failure, at the second storage unit, in response to determining that the generated identifier that augmented the I/O command is not the same as the second storage unit identifier.

4. The method of claim 1, wherein the first storage unit is coupled to a first fibre channel adapter, wherein the destination is coupled to a second fibre channel adapter, wherein the first fibre channel adapter is coupled to the second fibre channel adapter via a switched fabric, and wherein the switched fabric includes a plurality of switches, and wherein a destination address of the second storage unit returned by a switch of the plurality of switches to the first storage unit is not unique.

5. The method of claim 1, wherein the first storage unit is a primary storage control unit and the destination is a secondary storage control unit, and wherein the primary storage control unit is coupled to the secondary storage control unit.

6. A method, comprising:
  receiving, at a storage unit, an I/O command, wherein the storage unit is associated with a storage unit identifier;
  determining, at the storage unit, whether the I/O command is associated with an identifier that identifies a destination for which the I/O command is intended, wherein the I/O command has been augmented with the identifier by another storage unit from which the storage unit received the I/O command; and
  determining, at the storage unit, whether the identifier is the same as the storage unit identifier, in response to determining that the identifier associated with the I/O command identifies the destination for which the I/O command is intended, wherein the storage unit is a secondary storage control unit, and wherein the identifier further comprises:
   (i) a World Wide Node Name of the secondary storage control unit;
   (ii) a World Wide Port Name of a port of a fibre channel adapter coupled to the secondary storage control unit, wherein the port is used for communications; and a storage subsystem identification of a storage subsystem coupled to the secondary storage control unit; and
   (iii) a storage subsystem identification of a storage subsystem coupled to the secondary storage control unit.

7. The method of claim 6, further comprising:
  executing the I/O command, at the storage unit, in response to determining that the identifier is the same as the storage unit identifier.

8. The method of claim 6, further comprising:
  generating a failure, at the storage unit, in response to determining that the identifier is not the same as the as the storage unit identifier.

9. The method of claim 6, wherein the another storage unit is a first storage unit, wherein the secondary storage control unit is a second storage unit, wherein the first storage unit is coupled to a first fibre channel adapter, wherein the destination is coupled to a second fibre channel adapter, wherein the first fibre channel adapter is coupled to the second fibre channel adapter via a switched fabric, and wherein the switched fabric includes a plurality of switches, and wherein a destination address of the second storage unit returned by a switch of the plurality of switches to the first storage unit is not unique.

* * * * *